(12) United States Patent
Zhu (10) Patent No.: US 12,416,163 B2
(45) Date of Patent: Sep. 16, 2025

(54) FABRICATED LEVELING COMPOSITE RADIATION ENERGY-SAVING CONCRETE WALL AND CONSTRUCTION METHOD THEREFOR

(71) Applicant: Qinjiang Zhu, Shanghai (CN)

(72) Inventor: Qinjiang Zhu, Shanghai (CN)

( * ) Notice: Subject to any disclaimer, the term of this patent is extended or adjusted under 35 U.S.C. 154(b) by 0 days.

(21) Appl. No.: 18/294,152

(22) PCT Filed: Apr. 28, 2021

(86) PCT No.: PCT/CN2021/090402
§ 371 (c)(1),
(2) Date: Jan. 31, 2024

(87) PCT Pub. No.: WO2022/217652
PCT Pub. Date: Oct. 20, 2022

(65) Prior Publication Data
US 2025/0163706 A1    May 22, 2025

(30) Foreign Application Priority Data

Apr. 12, 2021 (CN) .......................... 202110387923.7

(51) Int. Cl.
*E04F 13/08* (2006.01)
(52) U.S. Cl.
CPC .................. *E04F 13/0853* (2013.01)
(58) Field of Classification Search
CPC .............. E04F 13/0801; E04F 13/0832; E04F 13/0839; E04F 13/0841; E04F 13/0853; E04F 13/0855; E04F 13/0862; E04F 13/0875; E04B 1/76; E04B 1/7616; E04B 1/7629; E04B 1/7633; E04B 1/7675; E04B 1/80

USPC ................................................. 52/126.3, 365
See application file for complete search history.

(56) References Cited

U.S. PATENT DOCUMENTS

| | | | | |
|---|---|---|---|---|
| 1,503,148 A | * | 7/1924 | Bernstrom | F16B 9/052 52/703 |
| 2,201,129 A | * | 5/1940 | Weiland | E04F 13/0839 52/509 |
| 3,019,864 A | * | 2/1962 | Lester | F23M 5/00 52/787.11 |

(Continued)

FOREIGN PATENT DOCUMENTS

| CN | 1920201 A | 2/2007 |
|---|---|---|
| CN | 202324443 U | 7/2012 |

(Continued)

OTHER PUBLICATIONS

Internation Search Report of PCT/CN2021/090402, Mailed Jan. 19, 2022.

*Primary Examiner* — James M Ference (57) ABSTRACT

A fabricated leveling composite radiation energy-saving concrete wall includes a concrete wall and further includes an insulation roll wrapped on a surface of the concrete wall and a veneer having a surface attached to an outer surface of the insulation roll, and support members are uniformly arranged between the veneer and the surface of the concrete wall to prevent the insulation roll from being crushed. In the present invention, the support members that play an anchoring role are bonded to the concrete wall and the veneer, which will not damage a waterproof layer of the wall and the veneer.

7 Claims, 12 Drawing Sheets

(56) References Cited

U.S. PATENT DOCUMENTS

| | | | | |
|---|---|---|---|---|
| 3,450,427 A * | 6/1969 | Fischer | E04F 13/0855 | 52/378 |
| 3,715,850 A * | 2/1973 | Chambers | E04F 13/0855 | 52/235 |
| 3,771,272 A * | 11/1973 | Mihaly | F16B 5/01 | 52/366 |
| 3,889,439 A * | 6/1975 | Kaspar | E04F 13/0808 | 403/107 |
| 3,961,453 A * | 6/1976 | Couwenbergs | E04D 11/005 | 52/480 |
| 4,040,222 A * | 8/1977 | Cull | E04F 13/0853 | 52/749.1 |
| 4,083,161 A * | 4/1978 | Moen | E04B 1/4157 | 249/213 |
| 4,329,821 A * | 5/1982 | Long | E04G 17/06 | 52/410 |
| 4,360,993 A * | 11/1982 | Tomokazu | F16B 5/0233 | 52/378 |
| 5,280,690 A * | 1/1994 | Hu | E04F 13/0855 | 52/511 |
| 5,307,602 A * | 5/1994 | Lebraut | E04F 13/0855 | 52/235 |
| 5,809,725 A * | 9/1998 | Cretti | E04F 13/045 | 52/565 |
| 6,702,515 B1 * | 3/2004 | Frederiksen | E04D 11/005 | 52/509 |
| 6,725,616 B1 * | 4/2004 | Pease | E04B 1/762 | 52/309.7 |
| 10,011,988 B2 * | 7/2018 | Foderberg | E04C 2/46 | |
| 11,015,350 B2 * | 5/2021 | Gebhardt | E04F 13/0832 | |
| 11,078,663 B1 * | 8/2021 | Wigboldy | E04B 1/7633 | |
| 11,566,418 B2 * | 1/2023 | Ben Saad | E04F 13/0855 | |
| 2007/0068104 A1 * | 3/2007 | Weir | E04B 1/7023 | 52/404.1 |
| 2012/0297725 A1 * | 11/2012 | Anastasi | E04F 13/0816 | 52/705 |
| 2014/0000204 A1 * | 1/2014 | Wu | E04B 1/94 | 52/506.05 |
| 2014/0075882 A1 * | 3/2014 | Porter | E04F 13/0816 | 52/745.09 |
| 2014/0209270 A1 * | 7/2014 | Imbabi | E04C 2/205 | 165/56 |
| 2025/0163706 A1 * | 5/2025 | Zhu | E04F 13/0853 | |

FOREIGN PATENT DOCUMENTS

| | | |
|---|---|---|
| CN | 102943537 A | 2/2013 |
| CN | 202745213 U | 2/2013 |
| CN | 106049768 A | 10/2016 |
| CN | 208962618 U | 6/2019 |
| CN | 211143575 U | 7/2020 |
| RU | 2011153755 A | 7/2013 |
| WO | 0151724 A1 | 7/2001 |

* cited by examiner

FABRICATED LEVELING COMPOSITE RADIATION ENERGY-SAVING CONCRETE WALL AND CONSTRUCTION METHOD THEREFOR

TECHNICAL FIELD

The present invention relates to a wall of a building, in particular to a fabricated leveling composite radiation energy-saving concrete wall and a construction method therefor.

BACKGROUND

The increase in urbanization rate is an irreversible trend worldwide. More and more people will live in houses located in cities. Living in cities means that heating and cooling must rely on municipal engineering for water, electricity, and heating, instead of nearby resources such as firewood, peat, and natural water bodies. If corresponding measures are not taken, average energy consumption of residents will be greatly increased, which is not conducive to sustainable development.

Insulation treatment on a building can greatly block heat exchange inside and outside the building, thereby reducing energy consumption for maintaining a comfortable temperature inside the building. There are three ways of heat exchange: convection, radiation, and conduction, so the way the building insulation layer works is to block the three channels of heat exchange. Existing insulation materials are generally porous materials bonded with metal foils. Extremely low thermal conductivity of air constrained in the porous materials is responsible for blocking heat conduction; extremely large surface area and adsorption capacity of the porous materials constrain the air in pores from flowing, thereby blocking heat convection; and the metal foils can be approximated as white bodies, which generate blackbody radiation close to zero and reflect back heat radiation inside buildings.

Existing porous materials include organic materials and inorganic materials. Common organic porous materials include rubber and polyvinyl chloride mixed rubber plastic insulation materials, foamed polystyrene plastics, foamed polyurethane, various fiber products, etc. Common inorganic porous materials include foamed gypsum boards, rock wool, glass wool, etc.

Organic porous materials with large porosity are easily available, so the insulation effects of the organic porous materials are significantly better than those of inorganic porous materials under normal conditions. However, the organic porous materials are flammable, and their fire resistance can generally only reach B1 level, almost not A level, which cannot meet fireproof requirements of high-rise buildings. Current insulation boards that meet fireproof requirements of buildings, such as foamed gypsum boards and glass wool boards, generally have a large density and a poor insulation effect, and a thick layer of insulation board needs to be hung on a wall. The thick insulation layer is hung by erecting light steel keels on the wall. The erecting process of the light steel keels is not only slow, but also causes serious damage to the wall. The light steel keels further form cold bridges to decrease the insulation effect.

Aerogels are a type of special porous materials. Their porosities are far greater than those of ordinary porous materials and can generally reach 80% or more, and the highest can reach 99% or more. Therefore, their densities are extremely low, their insulation effects are far better than those of ordinary porous materials, and very thin aerogels can meet insulation requirements. However, current aerogels are mainly used for pipeline insulation (without considering flatness and being cut into complex shapes and pressed, so they have very low requirements for the strength of insulation materials), and have not been used for building insulation.

The main resistance to the use of aerogels for building insulation is their low strength (their strength is equivalent to that of cake, but their elasticity is generally lower than that of cake). Current aerogels that can meet the fireproof requirements of buildings, such as silica aerogel, have low strength and almost no elasticity, "powder drops" from them at a touch, and they collapse under very light extrusion. Both handling and cutting are facing great difficulties. During transportation, special containers are often required to protect them. In addition, whether exposed on the outside of a building or sandwiched between a concrete wall and a veneer, they will be compressed during mounting and lose their insulation ability.

SUMMARY

The present invention provides a fabricated leveling composite radiation energy-saving concrete wall and a construction method therefor.

Technical problem to be solved: Among current commonly used building insulation materials, organic materials cannot meet fireproof requirements of buildings; and inorganic materials have poor insulation effects, need to be made very thick, and have a large density, making installation difficult and causing damage to walls, for example, anchors such as light steel keels may form cold bridges that damage the insulation effect.

To solve the above technical problem, the present invention adopts the following technical solution: A fabricated leveling composite radiation energy-saving concrete wall includes a concrete wall and further includes an insulation roll wrapped on a surface of the concrete wall and a veneer having a surface attached to an outer surface of the insulation roll, and support members are uniformly arranged between the veneer and the surface of the concrete wall to prevent the insulation roll from being crushed.

Further, the veneer is connected to the surface of the concrete wall through the support members, and each support member is adjustable in size in a direction perpendicular to the veneer and is provided with a locking device for locking the adjusted size.

Further, the support members are hollow blocks filled with an insulation material.

Further, the support members include edge support members used for supporting edges of the veneer, corner support members used for supporting corners of the veneer, and main support members used for supporting portions of the veneer except the edges and corners; one edge of each edge support member is flush with an edge of the veneer, and each corner support member has a corner matching a corner of the veneer; and edges of the support members inside the insulation roll transition smoothly.

Further, the support members are bonded to the veneer and the surface of the concrete wall respectively, and reinforcement bars for strengthening the bonding effect are arranged on surfaces, in contact with the veneer and the surface of the concrete wall, of the support members respectively.

Further, the main support member is a circular flat box with upper and lower surfaces parallel to the veneer, and a box cover and a box body of the circular flat box are connected by threads.

Further, a metal foil is wrapped on two side surfaces of the insulation roll respectively, the insulation roll is connected to the metal foil by a flexible adhesive, and the flexible adhesive fills a gap between the insulation roll and the metal foil.

Further, the insulation roll is an aerogel felt; the insulation roll is a hydrophobic material; and the flexible adhesive is a waterproof adhesive.

Further, the insulation roll is stacked in multiple layers on the surface of the concrete wall.

A method for mounting an insulation system on an energy-saving building is used for the construction of the foregoing fabricated leveling composite radiation energy-saving concrete wall, and includes the following steps:

step 1: laying wall pipelines on a surface of a completed concrete wall according to drawings;

step 2: bonding a first layer of insulation roll with holes in one-to-one correspondence to support members to the surface of the concrete wall, and forming an avoidance port on the first layer of insulation roll to expose the wall pipelines and ensure that the wall pipelines are located within an outer surface of the first layer of insulation roll;

step 3: bonding main support members in the holes of the insulation roll with a structural adhesive, and adjusting thicknesses of the main support members by rotation to ensure that tops of the main support members are coplanar; then bonding edge support members and corner support members with the structural adhesive, and adjusting a thickness of the structural adhesive at bottoms of the edge support members and the corner support members to ensure that tops of the edge support members and the corner support members are coplanar with the tops of the main support members;

step 4: bonding a second layer of insulation roll with holes in one-to-one correspondence to the support members to the first layer of insulation roll to ensure that a thickness of the second layer of insulation roll meets climate and technical requirements, and that an outer surface of the second layer of insulation roll is located within a plane where the tops of the support members are located;

step 5: sealing joints on the insulation roll with aluminum foil tapes;

step 6: bonding a veneer to the support members with the structural adhesive after the wall pipelines are tested; and step 7: constructing a decorative layer on the veneer.

Compared with the prior art, the fabricated leveling composite radiation energy-saving concrete wall and the construction method therefor in the present invention have the following beneficial effects:

In the present invention, the support members that play an anchoring role are bonded to the concrete wall and the veneer, which will not damage a waterproof layer of the wall and the veneer. Meanwhile, all members are prefabricated, and the wall pipelines are buried in the insulation roll instead of grooves in the wall, so any drilling or grooving operation on site is not required, only simple assembly is required, and fast and quiet mounting can be achieved;

In the present invention, the metal foil and the flexible adhesive between the metal foil and the insulation roll jointly constrain and protect the insulation roll, making the surface of the insulation roll regular and not easily consumed or damaged by friction. The support members play a supporting role to prevent the insulation roll from being squeezed. The combination of the above two protective measures enables thin and efficient but fragile insulation rolls such as aerogel felts to be applied to wall insulation, thereby significantly reducing the thickness and dead weight of the external insulation layer, and enabling the insulation layer to be hung with anchoring members having low strength and even with the structural adhesive;

In the present invention, the support members that are adjustable in thickness and less prone to deformation are mounted on the building wall, and then the veneer is mounted on the leveled support members instead of the insulation roll that is prone to deformation, thereby ensuring the flatness of the veneer;

In the present invention, metal foils are bonded to two sides of the insulation roll, the metal foil on the side close to a heat source reflects back heat radiation from the heat source, and the metal foil on the side away from the heat source serves as a white body to prevent the occurrence of heat radiation in the insulation roll, so that the insulation roll can effectively block the loss of heat/cold capacity due to the heat radiation in the building;

In the present invention, the edges of the support members located in the insulation roll smoothly transition without any protrusion inserted into the insulation roll, thereby avoiding cracks starting from the edges of the support members in the insulation roll due to severe stress concentration.

In the figures, 1—concrete wall, 2—insulation roll, 21—metal foil, 22—aluminum foil tape, 3—veneer, 41—main support member, 42—edge support member, 43—corner support member, 5—reinforcement bar, 6—structural adhesive, 7—wall pipeline, 8—decorative layer.

DETAILED DESCRIPTION

Figure 1:
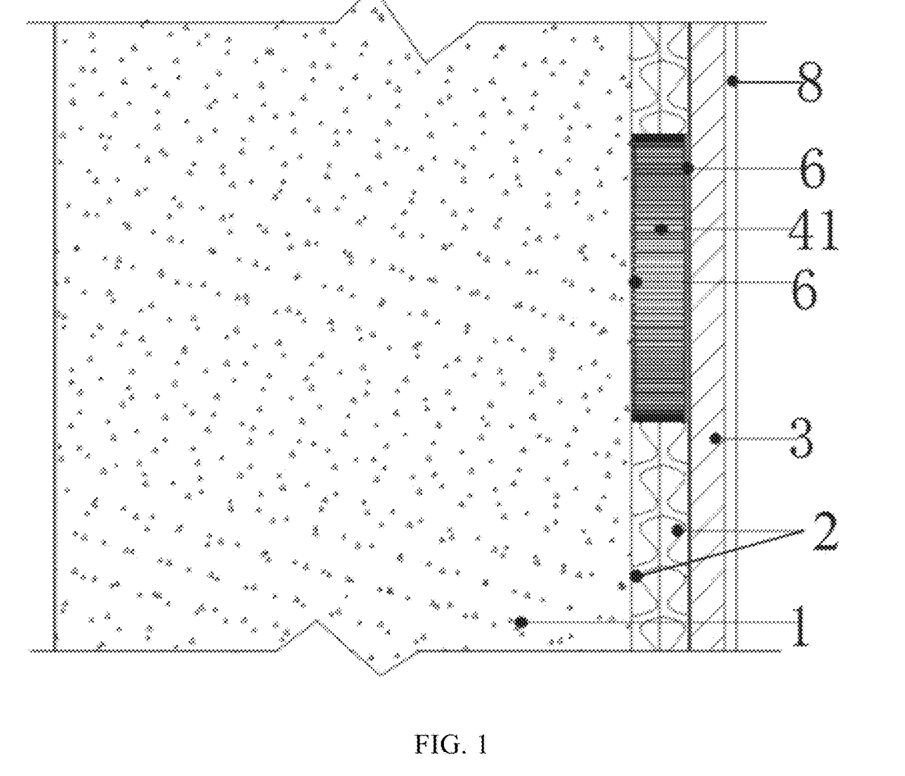
FIG. 1 is a schematic structural diagram of a fabricated leveling composite radiation energy-saving concrete wall of the present invention.

As shown in FIG. 1, a fabricated leveling composite radiation energy-saving concrete wall includes a concrete wall 1 and further includes an insulation roll 2 wrapped on a surface of the concrete wall 1 and a veneer 3 having a surface attached to an outer surface of the insulation roll 2, and support members are uniformly arranged between the veneer 3 and the surface of the concrete wall 1 to prevent the insulation roll 2 from being crushed. The insulation system here may be arranged on one or two sides of the concrete wall 1. The veneer 3 here also plays a protective role in separating the insulation roll 2 from the outside.

The veneer 3 is connected to the surface of the concrete wall 1 through the support members, and each support member is adjustable in size in a direction perpendicular to the veneer 3 and is provided with a locking device for locking the adjusted size. This can achieve adjustment as required to avoid crushing the insulation roll 2 or forming empty drums.

The support members are hollow blocks filled with an insulation material to avoid the formation of cold bridges. The insulation material filled inside the hollow blocks in this embodiment is aerogel.

Figure 4:
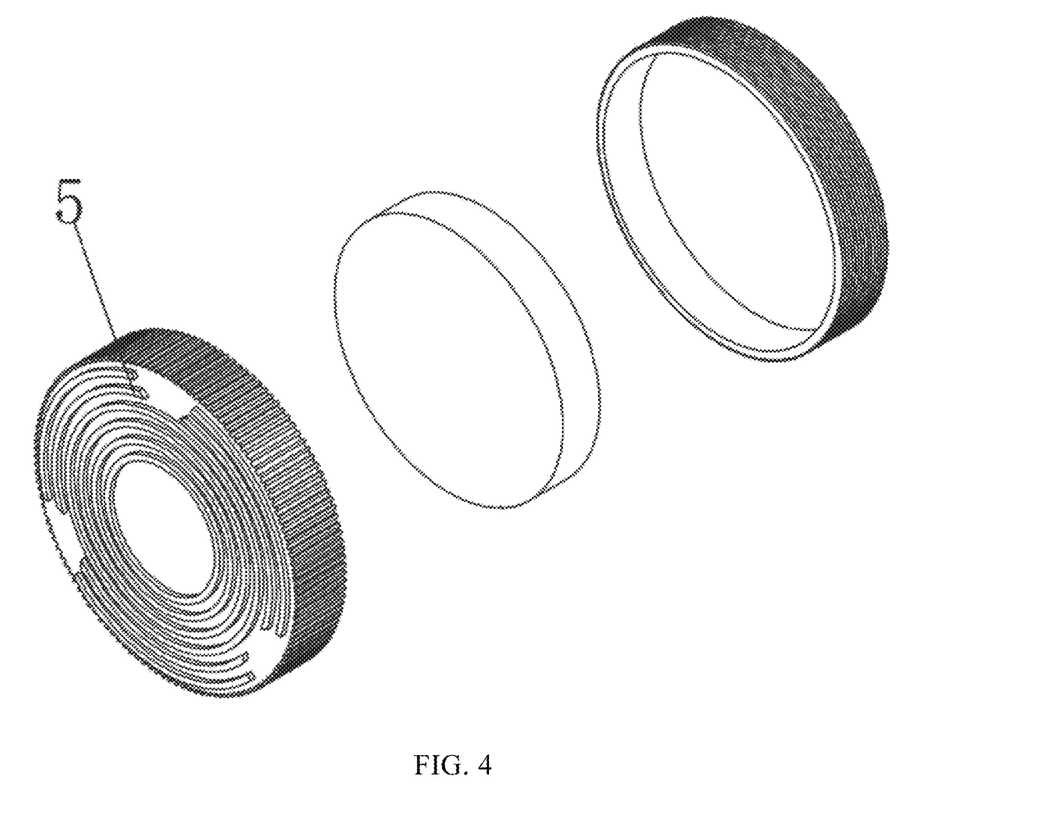
FIG. 4 is a structural breakdown diagram of a main support member.
Figure 5:
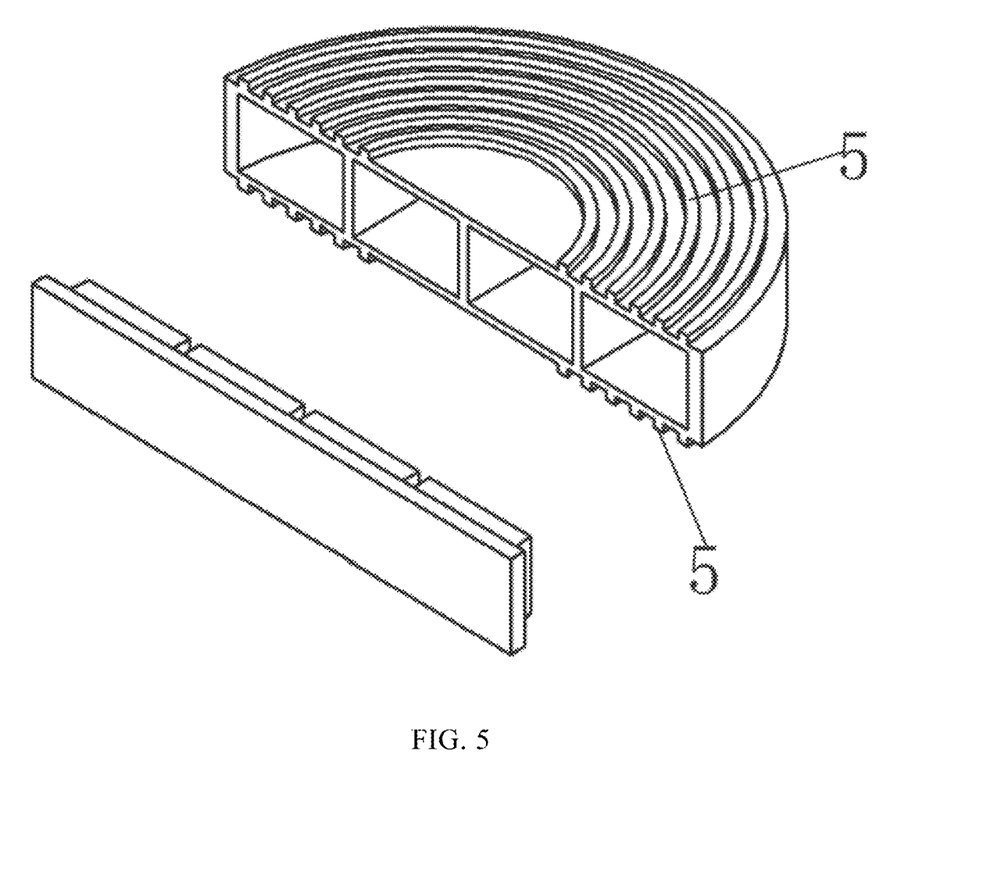
FIG. 5 is a structural breakdown diagram of an edge support member.
Figure 6:
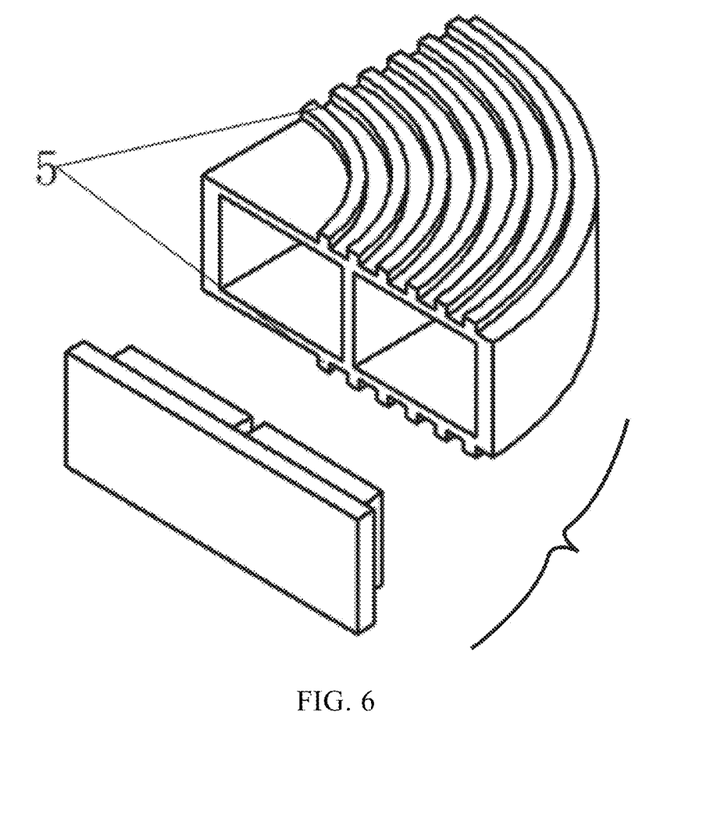
FIG. 6 is a structural breakdown diagram of a corner support member.

As shown in FIGS. 4-6, the support members include edge support members 42 used for supporting edges of the veneer 3, corner support members 43 used for supporting corners of the veneer 3, and main support members 41 used for supporting portions of the veneer 3 except the edges and corners; one edge of each edge support member 42 is flush with an edge of the veneer 3, and each corner support member 43 has a corner matching a corner of the veneer 3; and edges of the support members inside the insulation roll 2 transition smoothly to avoid the occurrence of cracks in the insulation roll 2.

Figure 3:
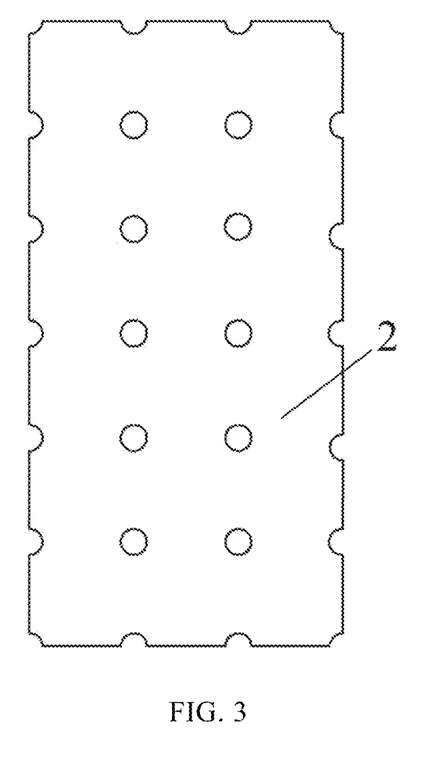
FIG. 3 is a schematic structural diagram of an insulation roll with reserved holes in one-to-one correspondence to support members.

Three types of support members are configured here for the following reasons: due to the uniform distribution of support members, some support members are inevitably distributed on the edges or corners of the veneer 3; and in order to accelerate the construction progress, holes on the insulation roll 2 that correspond to the support members have been drilled before mounting, the positions of the holes on the edges or corners cannot be adjusted on site, and as shown in FIG. 3, complete main support members 41 cannot be mounted in the holes on the edges or corners, so the edge support members 42 and the corner support members 43 are required to support the edges and corners of the veneer 3.

As shown in FIGS. 4-6, in this embodiment, the main support member 41 is a circular flat box, the edge support member 42 is a semi-circular flat box, the corner support member 43 is a quarter circular flat box, and box covers of the edge support member 42 and the corner support member 43 are opened at straight edge positions on their sides and are respectively connected to the edge support member 42 and the corner support member 43 by insertion for easy opening.

As shown in FIG. 4, the main support member 41 is a circular flat box with upper and lower surfaces parallel to the veneer 3, and the box cover and box body of the circular flat box are connected by threads. In this case, the distance between the box cover and the surface of the concrete wall 1 can be changed by rotation, and the distance can be locked by stopping the rotation. Note that the lead angle and friction angle of the threads of the box cover and the circular flat box should be well controlled. The friction angle should be greater than the lead angle to better lock the distance between the box cover and the concrete wall 1 after the rotation is stopped. Thicknesses of the edge support members 42 and the corner support members 43 can also be adjusted here. The method is to make the edge support members 42 and the corner support members 43 slightly thinner than the total thickness of the insulation roll 2, and then to change the thickness of a structural adhesive 6 brushed on two sides of the edge support members 42 and the corner support members 43.

The support members should be made of a material having a low thermal conductivity, such as engineering plastics, and metal should not be used, otherwise weak cold bridges will still be formed even in the presence of the insulation material. When conditions do not permit, the support members can be made of local materials, such as wooden blocks.

The support members are bonded to the veneer 3 and the surface of the concrete wall 1 respectively, and reinforcement bars 5 for strengthening the bonding effect are arranged on surfaces, in contact with the veneer 3 and the surface of the concrete wall 1, of the support members respectively. The reinforcement bars 5 are similar to ribs on ribbed steel bars or chiseled marks on a joint surface of new and old concrete.

Figure 2:
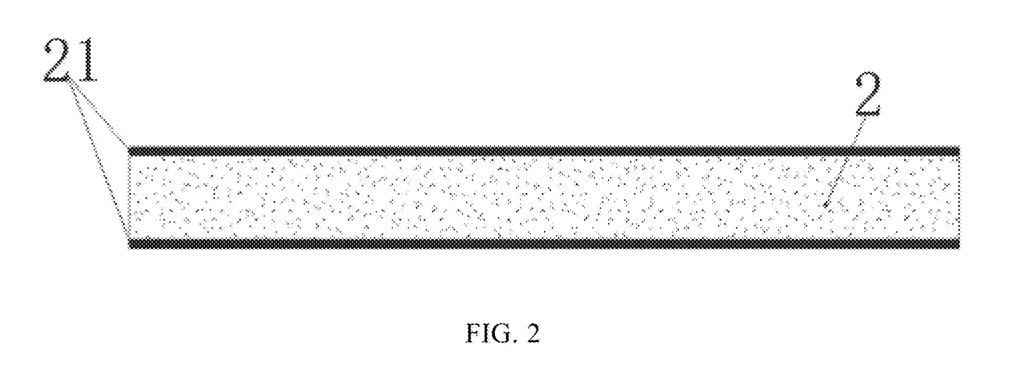
FIG. 2 is a schematic structural diagram of an insulation roll.

As shown in FIG. 2, a metal foil 21 is wrapped on two side surfaces of the insulation roll 2 respectively, the insulation roll 2 is connected to the metal foil 21 by a flexible adhesive, and the flexible adhesive fills a gap between the insulation roll 2 and the metal foil 21. In this embodiment, the metal foil 21 is an aluminum foil. Note that the metal foil 21 here not only functions to interrupt heat radiation, but also provides protection. Therefore, the metal foil should be thicker without affecting the bending of the insulation roll 2.

The insulation roll 2 is an aerogel felt or a cross-linked polyethylene insulation pad; and the insulation roll 2 is a hydrophobic material to prevent wetting or water infiltration and achieve a waterproof effect. The flexible adhesive is a waterproof adhesive to prevent failure due to water exposure.

In this embodiment, the insulation roll 2 is an inorganic insulation roll 2 such as a silica insulation roll 2, which has fine fluffs on the surface and does not stick to water like lotus leaves, making it a hydrophobic material.

The flexible adhesive here refers to an adhesive that remains soft after curing. The flexible adhesive is used for two effects: first, avoiding affecting the bending of the insulation roll 2; and second, forming an adhesive film covering the surface of the insulation roll 2 to constrain and protect the surface of the insulation roll 2 and prevent "powder drop" and cracking. The flexible adhesive should be waterproof and fireproof to prevent failure after immersion in water or burning. The flexible adhesive may be an MS adhesive.

The insulation roll 2 is stacked in multiple layers on the surface of the concrete wall 1. This aims to press conduits located on the surface of the concrete wall 1 under the insulation roll 2 without protrusions, thereby avoiding the occurrence of cold bridges. In this embodiment, two layers of insulation roll 2 are arranged on one side of the concrete wall 1, and the conduits can be pressed under the insulation roll 2 without protrusions by forming an avoidance port on only one layer of insulation roll 2 attached to the concrete wall 1, not on the two layers of insulation roll 2.

Figure 7:
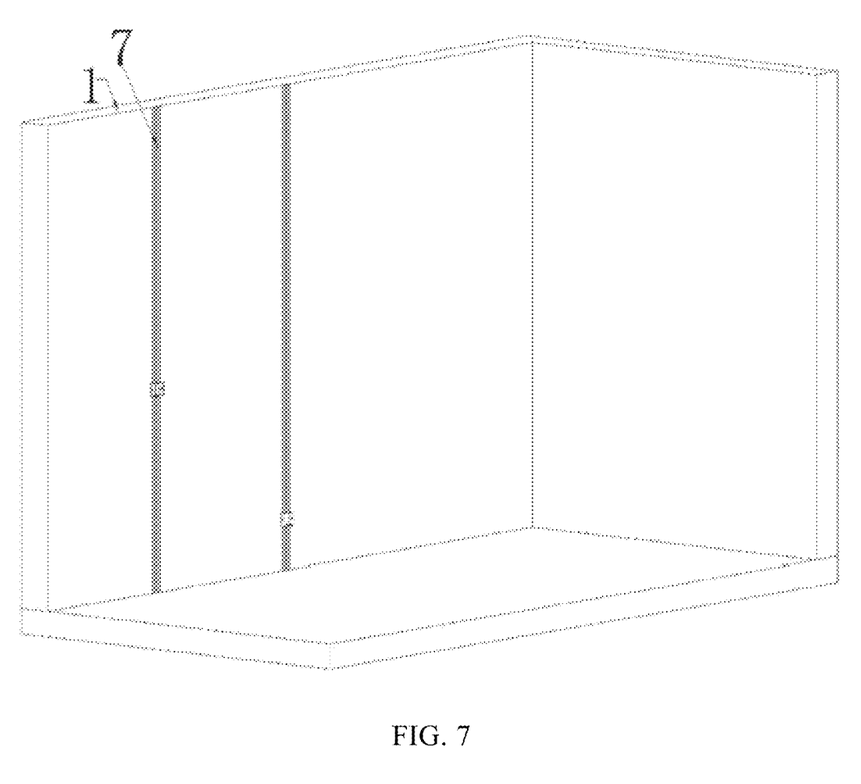
FIG. 7 is a schematic diagram of components mounted in step 1.
Figure 8:
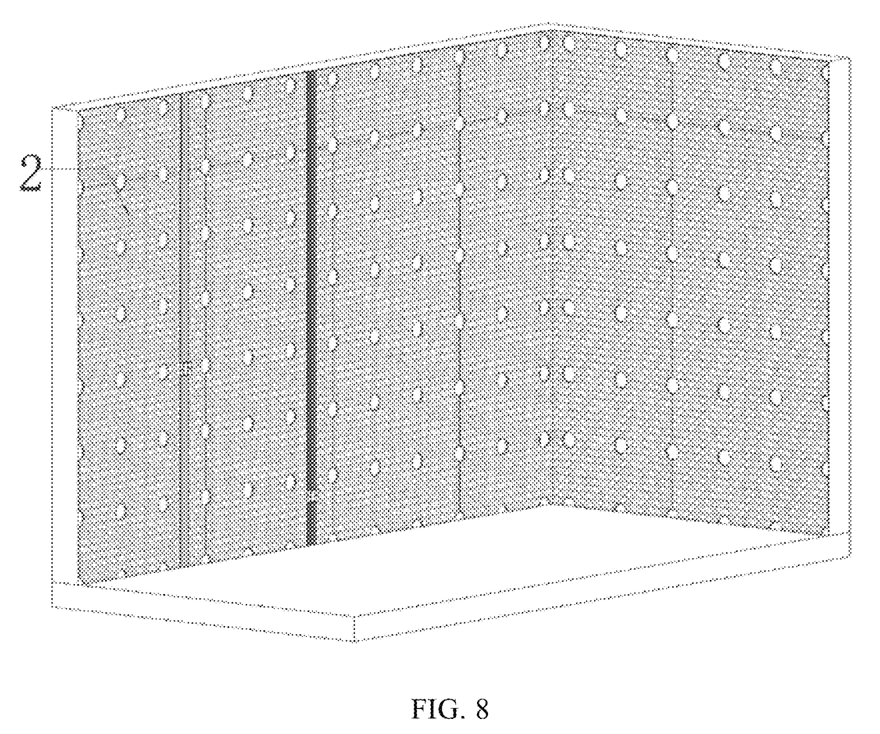
FIG. 8 is a schematic diagram of components mounted in step 2.
Figure 9:
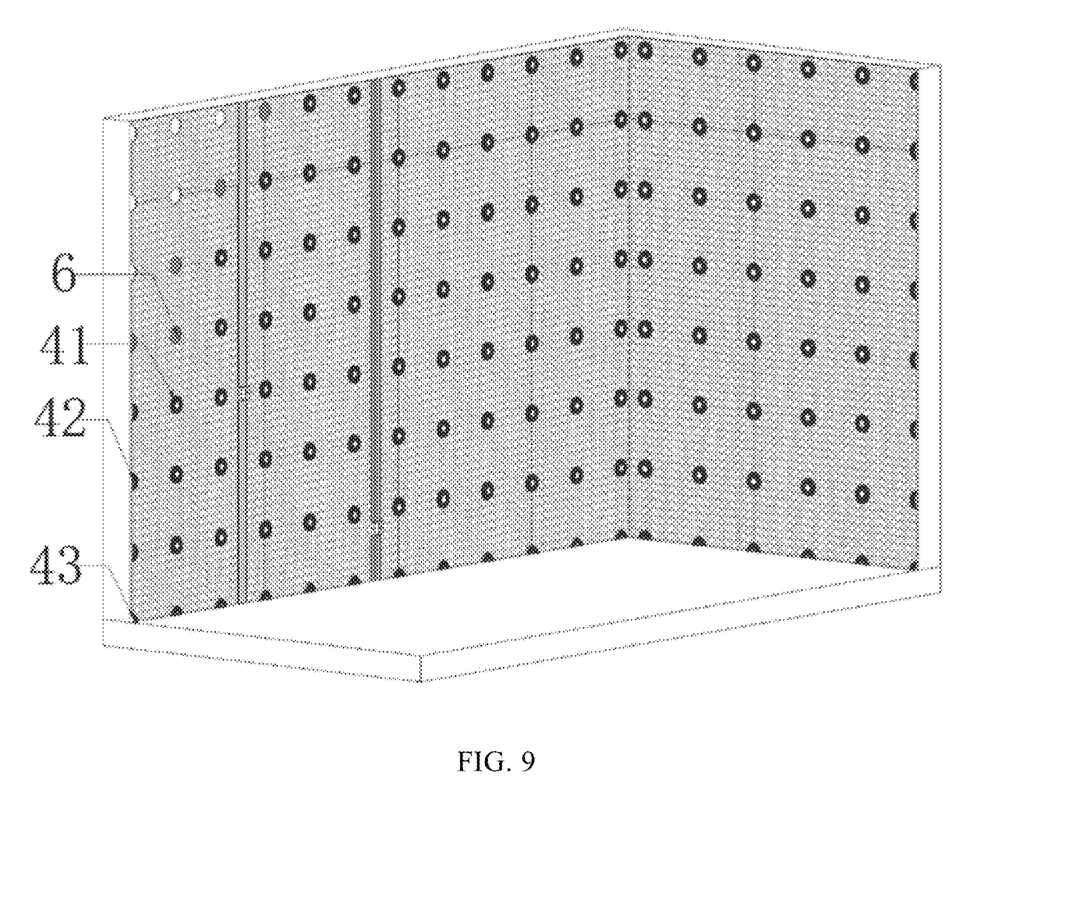
FIG. 9 is a schematic diagram of components mounted in step 3.
Figure 10:
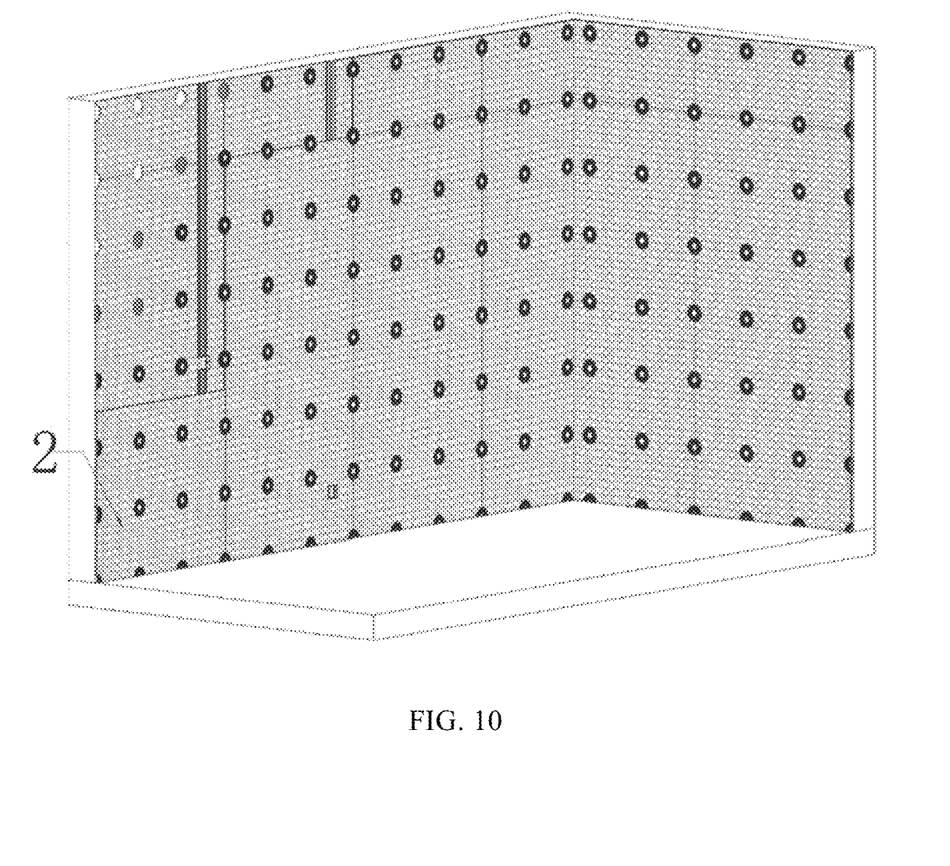
FIG. 10 is a schematic diagram of components mounted in step 4.
Figure 11:
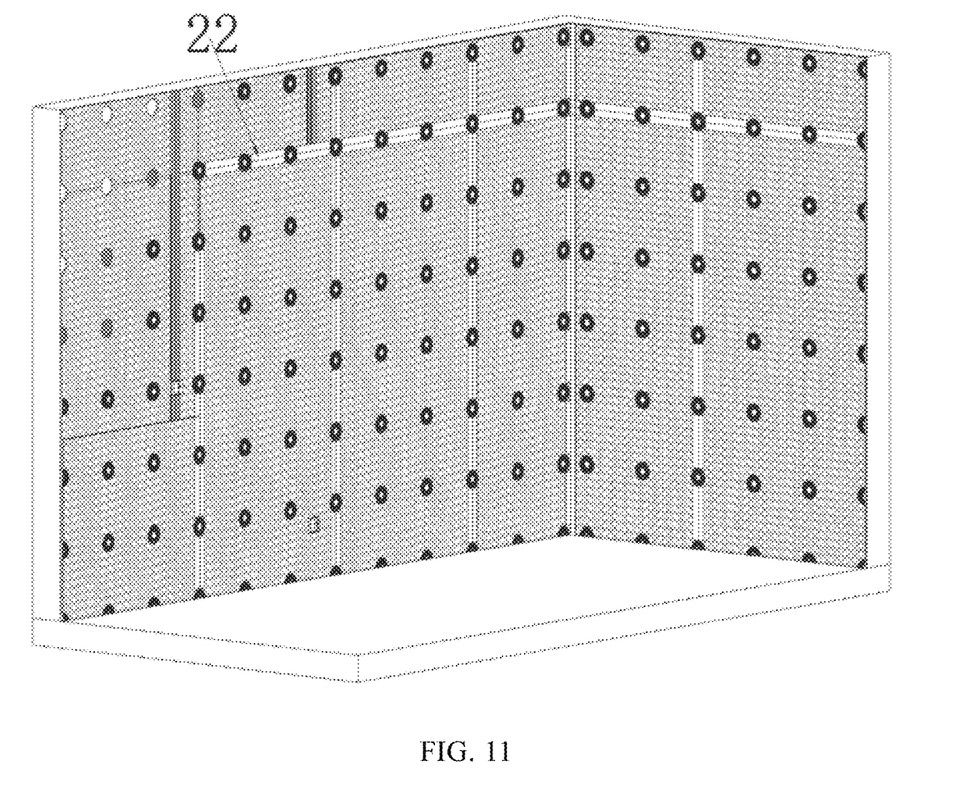
FIG. 11 is a schematic diagram of components mounted in step 5.
Figure 12:
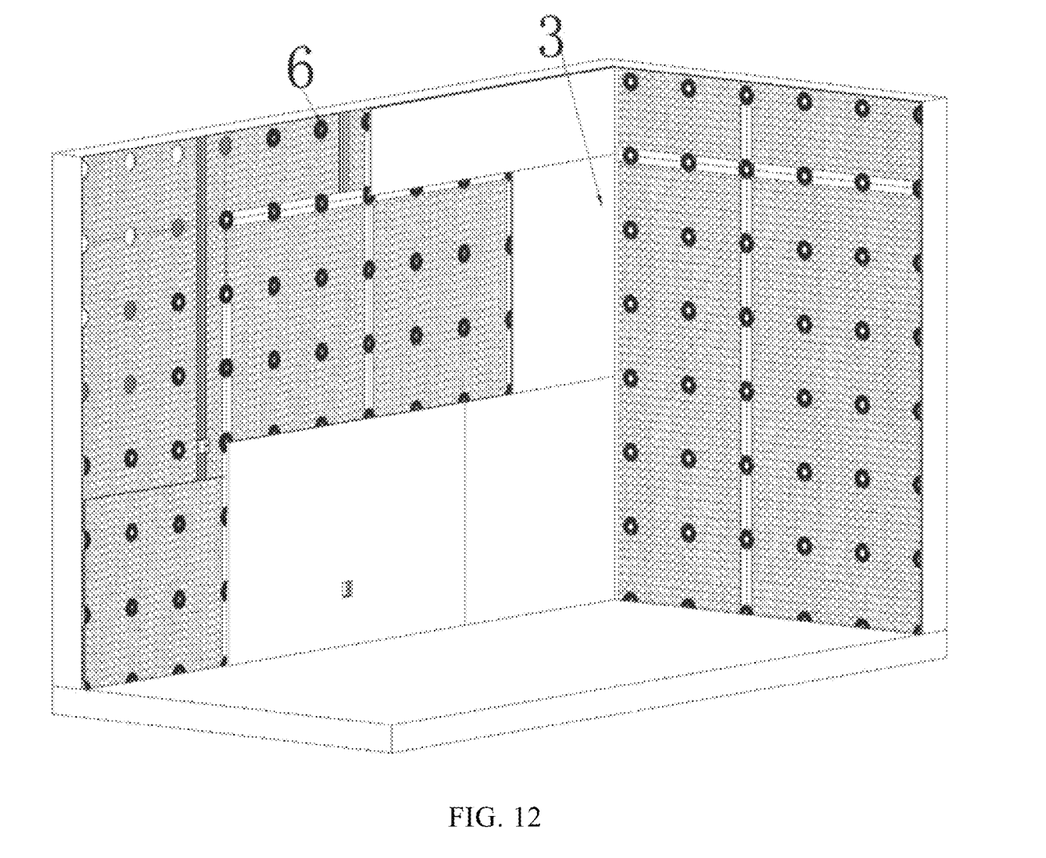
FIG. 12 is a schematic diagram of components mounted in step 6.
Figure 13:
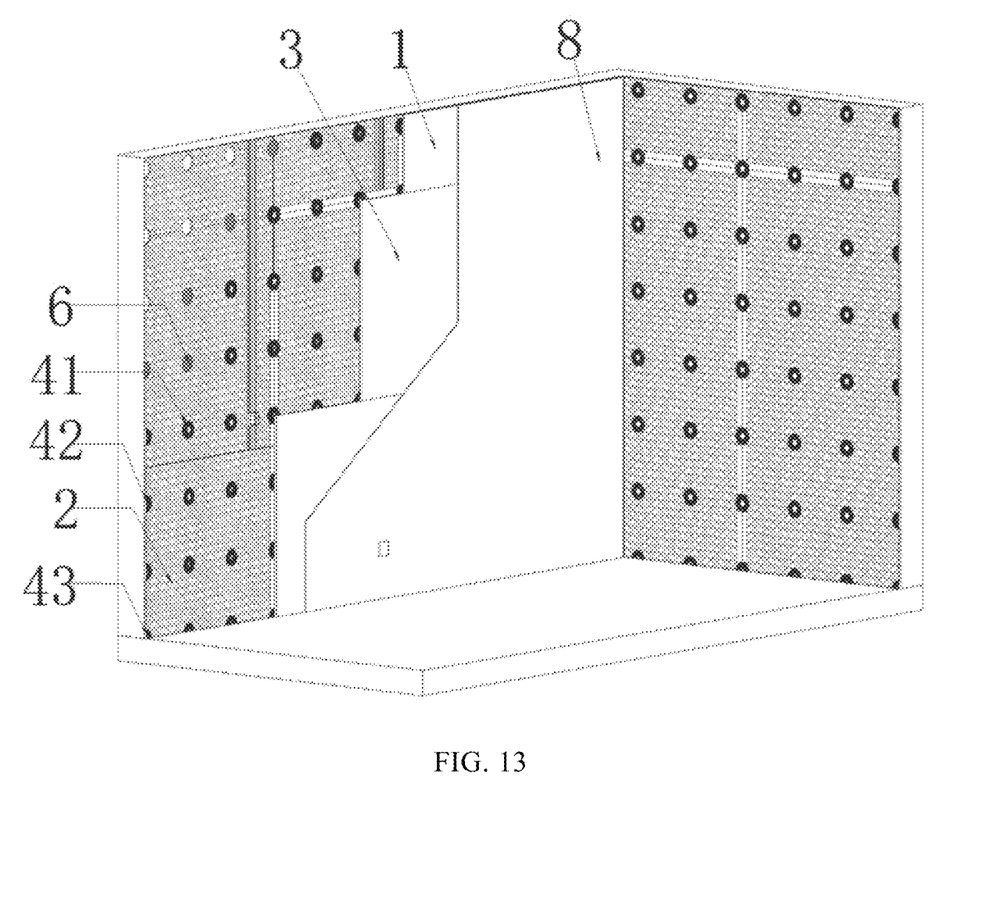
FIG. 13 is a schematic diagram of components mounted in step 7.

A method for mounting an insulation system on an energy-saving building is used for the construction of the foregoing fabricated leveling composite radiation energy-saving concrete wall, and includes the following steps:

As shown in FIG. 7, step 1: wall pipelines 7 are laid on a surface of a completed concrete wall 1 according to drawings;

As shown in FIG. 8, step 2: a first layer of insulation roll 2 with holes in one-to-one correspondence to support members is bonded to the surface of the concrete wall 1, and an avoidance port is formed on the first layer of insulation roll 2 to expose the wall pipelines 7 and ensure that the wall pipelines 7 are located within an outer surface of the first layer of insulation roll 2. If a wire box needs to be mounted, the wire box should be flush with an outer surface of a veneer 3. In this case, when the wire box is not used, a layer of insulation roll 2 may be bonded to avoid the formation of cold bridges;

As shown in FIG. 9, step 3: main support members 41 are bonded in the holes of the insulation roll 2 with a structural adhesive 6, and thicknesses of the main support members 41 are adjusted by rotation to ensure that tops of the main support members 41 are coplanar; then edge support members 42 and corner support members 43 are bonded with the structural adhesive 6, and a thickness of the structural adhesive 6 at bottoms of the edge support members 42 and the corner support members 43 is adjusted to ensure that tops of the edge support members 42 and the corner support members 43 are coplanar with the tops of the main support members 41;

As shown in FIG. 10, step 4: a second layer of insulation roll 2 with holes in one-to-one correspondence to the support members is bonded to the first layer of insulation roll 2 to ensure that a thickness of the second layer of insulation roll 2 meets climate and technical requirements, and that an outer surface of the second layer of insulation roll 2 is located within a plane where the tops of the support members are located;

As shown in FIG. 11, step 5: joints on the insulation roll 2 are sealed with aluminum foil tapes 22;

As shown in FIG. 12, step 6: after the wall pipelines 7 are tested, a veneer 3 is bonded to the support members with the structural adhesive 6;

As shown in FIG. 13, step 7: a decorative layer 8 is constructed on the veneer 3.

Note that the concrete wall 1 here refers to all walls that require insulation on buildings, including ceilings.

The above-described embodiments are merely preferred embodiments of the present invention, and the scope of the present invention is not limited thereto. Various modifications and improvements made by those of ordinary skill in the art without departing from the design spirit of the present invention shall fall into the protection scope determined by the claims of the present invention.

What is claimed is:

1. A fabricated leveling composite radiation energy-saving concrete wall, comprising a concrete wall, and further comprising an insulation roll wrapped on a surface of the concrete wall and a veneer having a surface attached to an outer surface of the insulation roll, wherein support members are uniformly arranged between the veneer and the surface of the concrete wall to prevent the insulation roll from being crushed;

the veneer is connected to the surface of the concrete wall through the support members, and each of the support members is adjustable in size in a direction perpendicular to the veneer and is provided with a locker for locking the adjustable size;

the support members are bonded to the veneer and the surface of the concrete wall respectively;

the insulation roll is an aerogel felt;

the support members comprise edge support members used for supporting edges of the veneer, corner support members used for supporting corners of the veneer, and main support members used for supporting portions of the veneer except the edges and the corners of the veneer; an edge of each of the edge support members is flush with a respective one of the edges of the veneer, and each of the corner support members has a corner; and the main support members are each a circular flat box with upper and lower surfaces parallel to the veneer, and a box cover and a box body of the circular flat box are connected by threads.

2. The fabricated leveling composite radiation energy-saving concrete wall according to claim 1, wherein the support members are each hollow blocks filled with an insulation material.

3. The fabricated leveling composite radiation energy-saving concrete wall according to claim 1, wherein reinforcement bars are arranged on surfaces of the support members that contact the veneer and on surfaces of the support members that contact the concrete wall.

4. The fabricated leveling composite radiation energy-saving concrete wall according to claim 1, wherein a metal foil is wrapped on two side surfaces of the insulation roll respectively, the insulation roll is connected to the metal foil by a flexible adhesive, and the flexible adhesive fills a gap between the insulation roll and the metal foil.

5. The fabricated leveling composite radiation energy-saving concrete wall according to claim 4, wherein the insulation roll is a hydrophobic material; and the flexible adhesive is a waterproof adhesive.

6. The fabricated leveling composite radiation energy-saving concrete wall according to claim 1, wherein the insulation roll is stacked in multiple layers on the surface of the concrete wall.

7. A construction method for an energy-saving wall, used for mounting the fabricated leveling composite radiation energy-saving concrete wall according to claim 1, and comprising:

laying wall pipelines on the surface of the concrete wall;

bonding a first layer of the insulation roll with holes in one-to-one correspondence to the support members to the surface of the concrete wall, and forming an avoidance hole on the first layer of the insulation roll to expose the wall pipelines and ensure that the wall pipelines are located within an outer surface of the first layer of the insulation roll;

bonding the support members in the holes of the insulation roll with a structural adhesive, and adjusting thicknesses of the support members by rotation to ensure that tops of the support members are coplanar with each other; then bonding the edge support members and the corner support members with the structural adhesive, and adjusting a thickness of the structural adhesive at bottoms of the edge support members and the corner support members to ensure that tops of the edge support members and the corner support members are coplanar with the tops of the main support members;

bonding a second layer of the insulation roll with holes in one-to-one correspondence to the support members to the first layer of the insulation roll to ensure that a thickness of the second layer of the insulation roll;

sealing joints on the insulation roll with foil tapes;

bonding the veneer to the support members with the structural adhesive after the wall pipelines are tested; and constructing a decorative layer on the veneer.

\* \* \* \* \*